US011292624B1

(12) United States Patent
Frederick et al.

(10) Patent No.: US 11,292,624 B1
(45) Date of Patent: Apr. 5, 2022

(54) END OF ARM TOOL FOR LOADED CASE CLOSURE

(71) Applicant: Douglas Machine Inc., Alexandria, MN (US)

(72) Inventors: Aaron M. Frederick, Alexandria, MN (US); Travis John Bakker, Alexandria, MN (US); Robert Allan Danner, Jr., Alexandria, MN (US); Christopher Todd Davis, Alexandria, MN (US); Richard W. Lukanen, Jr., Alexandria, MN (US)

(73) Assignee: Douglas Machine Inc., Alexandria, MN (US)

( * ) Notice: Subject to any disclaimer, the term of this patent is extended or adjusted under 35 U.S.C. 154(b) by 129 days.

(21) Appl. No.: 16/593,505

(22) Filed: Oct. 4, 2019

Related U.S. Application Data

(60) Provisional application No. 62/741,687, filed on Oct. 5, 2018.

(51) Int. Cl.
*B65B 7/20* (2006.01)
*B25J 15/00* (2006.01)

(52) U.S. Cl.
CPC ............ *B65B 7/20* (2013.01); *B25J 15/0019* (2013.01)

(58) Field of Classification Search
CPC .............................. B65B 7/20; B25J 15/0019
See application file for complete search history.

(56) References Cited

U.S. PATENT DOCUMENTS

| 3,888,360 | A |   | 6/1975 | Ando et al. |
| 3,994,490 | A |   | 11/1976 | Smiltneek |
| 4,079,577 | A | * | 3/1978 | Ulrich ...................... B65B 7/20 |
|           |   |   |        |  53/377.2 |

(Continued)

FOREIGN PATENT DOCUMENTS

WO          2017041007 A1      3/2017

OTHER PUBLICATIONS

Ixapack Global, Complete Line for Doypack YouTube video posted May 9, 2017, https://www.youtube.com/watch?v=fIF5BGpp-Bs &feature=youtu.be accessed Feb. 7, 2020.

*Primary Examiner* — Nathaniel C Chukwurah
*Assistant Examiner* — Lucas E. A. Palmer
(74) *Attorney, Agent, or Firm* — Dicke, Billig & Czaja, PLLC

(57) ABSTRACT

A robotic end of arm tool to effectuate loaded case closure is provided. The tool includes a loaded case flap folding assembly to effectuate folding of flaps extending from a first case panel of a loaded case and, advantageously, loaded case squaring assemblies. The folding assembly includes flap engaging elements, a linkage and an actuator, the flap engaging elements operatively united with the linkage, the linkage actuatable via the actuator in furtherance of causing the flap engaging elements to engage the flaps extending from the first case panel. Flap engaging elements include a first flap engaging element for engagement with a first flap extending from the first case panel of the loaded case, and second and third flap engaging elements for engagement with second and third flaps opposingly extending from the first case panel, each of the second and third flaps adjacent the first flap.

21 Claims, 10 Drawing Sheets

(56) References Cited

U.S. PATENT DOCUMENTS

| | | | |
|---|---|---|---|
| 4,262,469 A * | 4/1981 | Ooms | B65B 7/20 |
| | | | 200/300 |
| 4,524,560 A * | 6/1985 | Goodman | B65B 7/20 |
| | | | 53/377.3 |
| 4,807,428 A | 2/1989 | Boisseau | |
| 5,060,455 A | 10/1991 | Schmeisser | |
| 5,303,531 A | 4/1994 | Senalalne | |
| 5,642,603 A | 7/1997 | Tanaka | |
| 5,765,337 A | 6/1998 | Lodewegen et al. | |
| 5,809,746 A * | 9/1998 | DePuy | B65B 43/265 |
| | | | 198/728 |
| 6,006,493 A | 12/1999 | Focke et al. | |
| 6,209,293 B1 | 4/2001 | Powers | |
| 6,652,217 B2 | 11/2003 | Dettman et al. | |
| 6,859,683 B2 | 2/2005 | Parker et al. | |
| 7,409,812 B2 | 8/2008 | Gilmore et al. | |
| 7,886,503 B2 * | 2/2011 | Chase | B65B 51/067 |
| | | | 53/376.4 |
| 7,941,990 B2 | 5/2011 | Aquarius | |
| 8,387,349 B2 | 3/2013 | Bellante | |
| 8,671,651 B2 | 3/2014 | Poutot | |
| 9,696,221 B2 | 7/2017 | Lauzier et al. | |
| 10,549,924 B2 | 2/2020 | Zhang et al. | |
| 2005/0126123 A1* | 6/2005 | Chase | B65B 7/20 |
| | | | 53/415 |
| 2007/0204567 A1 | 9/2007 | Wintring et al. | |
| 2011/0131925 A1* | 6/2011 | Chase | B65B 51/067 |
| | | | 53/376.5 |
| 2012/0096808 A1* | 4/2012 | Poutot | B65B 5/024 |
| | | | 53/235 |
| 2012/0297733 A1* | 11/2012 | Pierson | B65B 35/50 |
| | | | 53/447 |
| 2013/0036716 A1* | 2/2013 | Tsutsumi | B65B 43/305 |
| | | | 53/564 |
| 2014/0102044 A1* | 4/2014 | Berglin | B65B 43/10 |
| | | | 53/452 |
| 2014/0135196 A1* | 5/2014 | Berglin | B65B 5/028 |
| | | | 493/416 |
| 2018/0086019 A1* | 3/2018 | Langen | B65D 5/02 |

* cited by examiner

END OF ARM TOOL FOR LOADED CASE CLOSURE

This is a United States utility patent application filed under 35 USC § 111(a) claiming priority under 35 USC § 120 of/to U.S. Pat. Appl. Ser. No. 62/741,687 filed Oct. 5, 2018 and entitled ROBOTIC CASE PACKER PLATFORM, incorporated by reference herein/by in its entirety.

TECHNICAL FIELD

The present invention is generally directed to automated robotic case packing operations, more particularly, to robotic loaded case closure operations, and more particularly still, to robotic end of arm tooling to effectuate loaded case closure.

BACKGROUND

Automated robotic case packing operations are characterized by case set up (i.e., at least partially erecting a case from a case blank sourced from a source of case blanks such as a magazine or pallet of case blanks or the like), case filing/loading (i.e., introducing articles/product into the partially erect case), and case closure (i.e., securingly housing/containing the product within or in relation to the case to create a package). Cases may generally comprise trays, wrap around, or knock down styles, with case loading operations comprising top load, horizontal load or bottom load, the nature of the case style and filing operation being a function of, among other things, the nature of the product.

Notionally, robotic case packers may be fairly characterized as having, or characterized by, work stations, for example in the instant context, case set up, case loading and loaded case closure stations, each station characterized by a robot to animate motions of/for an end effector or end of arm tool (EOAT) carried thereby. The EOAT, much like a hand at the end of an arm, is intended to engage a "work piece," in the instant context, a case blank as to the case set up station, an article group as to the case loading station, and a loaded case as to the loaded case closure station.

Numerous teachings directed to robotic case packing are known and commercially available. For example, Boisseau (U.S. Pat. No. 4,870,428), Focke et al. (U.S. Pat. No. 6,006,493), Bellante (U.S. Pat. No. 8,387,349), Poutot (U.S. Pat. No. 8,671,651), and Wintring et al. (US Pat. Appl. 2007/0204567) generally disclose machines for case set up, case loading and case closure operations, however, each generally emphasize a single aspect (i.e., operation) of the overall packer functionality.

As to EOATs in the context of case packing operations, numerous pick and play tools are known, generally categorized as vacuum, clamp or fork style. In the context of loaded case closure, heretofore known automated approaches have been rudimentary, with numerous pieces-parts, most often change parts or those found in plural assemblies, each requiring laborious adjustment with any departure in packing operation, namely, case size/style.

Of the cited exemplary group of case packing teachings, Bellante specifically emphasizes loaded case closing operations, noting that this operation, the concluding operation of the several case packing operations, has been a limiting operation (i.e., the closing assembly ought to processes its work piece a rate equivalent to the rates of upstream operations executed upon the work piece at the set up and loading stations).

Bellante discloses a loaded case closing station (FIG. 3) characterized by carriage 301 which is translatingly supported on track 302 for movement there along in a process flow direction, the carriage in turn translatingly supporting tool or head 300 on beam 303 for movement there along in a vertical direction (i.e., an ascending/descending motion relative to an underlying loaded case). The tool includes frame 310, an actuatable clamp 312 hingedly supported thereby for closure of front flap 104 of box lid 102 (FIG. 4), and a retainer 316 which works in conjunction with actuatable stop 317 to hold the case for lid/flap closure via its pivot clamp. After lid closure, the case is released and lid flaps 103 are thereafter operated upon by downstream guides (FIG. 9a-9c).

With increasing processing demands, for instance and without limitation, higher speed/throughput, greater reliability, improved repeatability, enhanced versatility, reduced downtime (e.g., for maintenance and/or change parts), reduced factory floor space, etc., a platform or modular approach remains advantageous and desirable. Moreover, select or individual operations of automated robotic case packing operations have likewise been a focal point for enhancement and even reimagining. Notionally, improved robotics/processing assemblies for set-up and loading operations have outpaced such assemblies for loaded case closure. Thus, it is believed desirable and advantageous to provide a robotic loaded case closure assembly which is efficient and compact, yet characterized by a working envelope which increases loaded case dwell time. Further still, there remains an unmet need for a versatile, multifunction robotic EOAT, robust in its functional approach as to all closing steps, to execute operations upon a loaded case in furtherance of forming a package, including but not limited to flap folding, loaded case squaring, and squared loaded case compression and sealing.

SUMMARY OF THE INVENTION

A robotic end of arm tool to effectuate loaded case closure is generally provided, and operational methods attendant therewith likewise contemplated and provided. The EOAT generally includes a first and second loaded case flap folding mechanisms. The first loaded case flap folding mechanism operates upon a first flap of flaps extending from a first case panel of a loaded case. The second loaded case flap folding mechanism operates upon second and third flaps of flaps extending from the first case panel of the loaded case. The EOAT further includes a linkage, operably joined to each of the first loaded case flap folding mechanism and the second loaded case flap folding mechanism, and an actuator actuatable to effectuate a change in a configuration for the linkage which simultaneously activates the first loaded case closure mechanism and the second loaded case closure mechanism. The EOAT additionally contemplates provisions for an actuatable loaded case squaring mechanism, the squaring mechanism being activated so as to square the loaded case in advance of activation of the first loaded case closure mechanism and the second loaded case closure mechanism.

Alternately, a further non-limiting a robotic end of arm tool is comprised of a loaded case flap folding assembly to effectuate folding of flaps extending from a first case panel of a loaded case. The folding assembly includes flap engaging elements, a linkage and an actuator, the flap engaging elements operatively united with the linkage, the linkage actuatable via the actuator in furtherance of causing the flap engaging elements to engage the flaps extending from the first case panel. Flap engaging elements include a first flap engaging element for engagement with a first flap extending from the first case panel of the loaded case, and second and third flap engaging elements for engagement with second and third flaps opposingly extending from the first case panel, each of the second and third flaps adjacent the first flap.

The linkage advantageously but not necessarily includes cooperating links and shafting united thereto. The shafting in turn including a primary shaft and secondary shafts, the primary shaft united with the cooperating links, the secondary shafts slavingly united with said primary shaft, with the first flap engaging element depending from the primary shaft, the second and third flap engaging elements depending from the secondary shafts. More specific features and advantages obtained in view of the summarized features will become apparent with reference to the drawing figures and DETAILED DESCRIPTION OF THE INVENTION.

BRIEF DESCRIPTION OF THE DRAWINGS

FIGS. 1-10 are provided herewith wherein:

FIG. 1 depicts, side elevation x-y coordinate system, a representative, non-limiting robotic case packer system, process flow left to right;

FIG. 2 depicts the system of FIG. 1, overhead plan view x-z coordinate system, process flow left to right;

FIG. 3 depicts system particulars corresponding to area A of FIG. 1, slightly from above, more specifically, select particulars associated with loaded case closure station IV;

FIG. 4 depicts, perspective side view slightly from above, an advantageous, non-limiting robotic end of arm tool (EOAT) for effectuating load case closure/closure-sealing;

FIG. 5 depicts, slight perspective view, an underside of the robotic EOAT of FIG. 4; and, FIGS. 6-10 depict operation of the robotic EOAT of FIG. 4, perspective end view in the processing flow path direction, more particularly, operation of a loaded case flap folding assembly.

DETAILED DESCRIPTION OF THE INVENTION

An exemplary, non-limiting robotic case packer or case packer platform is hereinafter briefly described and shown for the sake of providing context for contemplated robotic loaded case closure operations, more particularly, to robotic end of arm tooling to effectuate loaded case closure operations. Preferred, non-limiting assemblies, subassemblies, structures and/or mechanisms relating to and for an improved/simplified case packer/case packer platform are notionally taken up, with preferred, non-limiting assemblies, subassemblies, structures and/or mechanisms for robotic end of arm tooling to effectuate loaded case closure operations disclosed and presented throughout the figures of the subject disclosure. In advance of particulars for or with regard to the instant robotic end of arm tooling, in all contemplated and/or disclosed forms, some preliminary observations and/or comments as to Applicant's approach to automated case packing are set forth. Moreover, an overview of the structure of the subject disclosure is likewise set forth thereafter.

Figure 1:
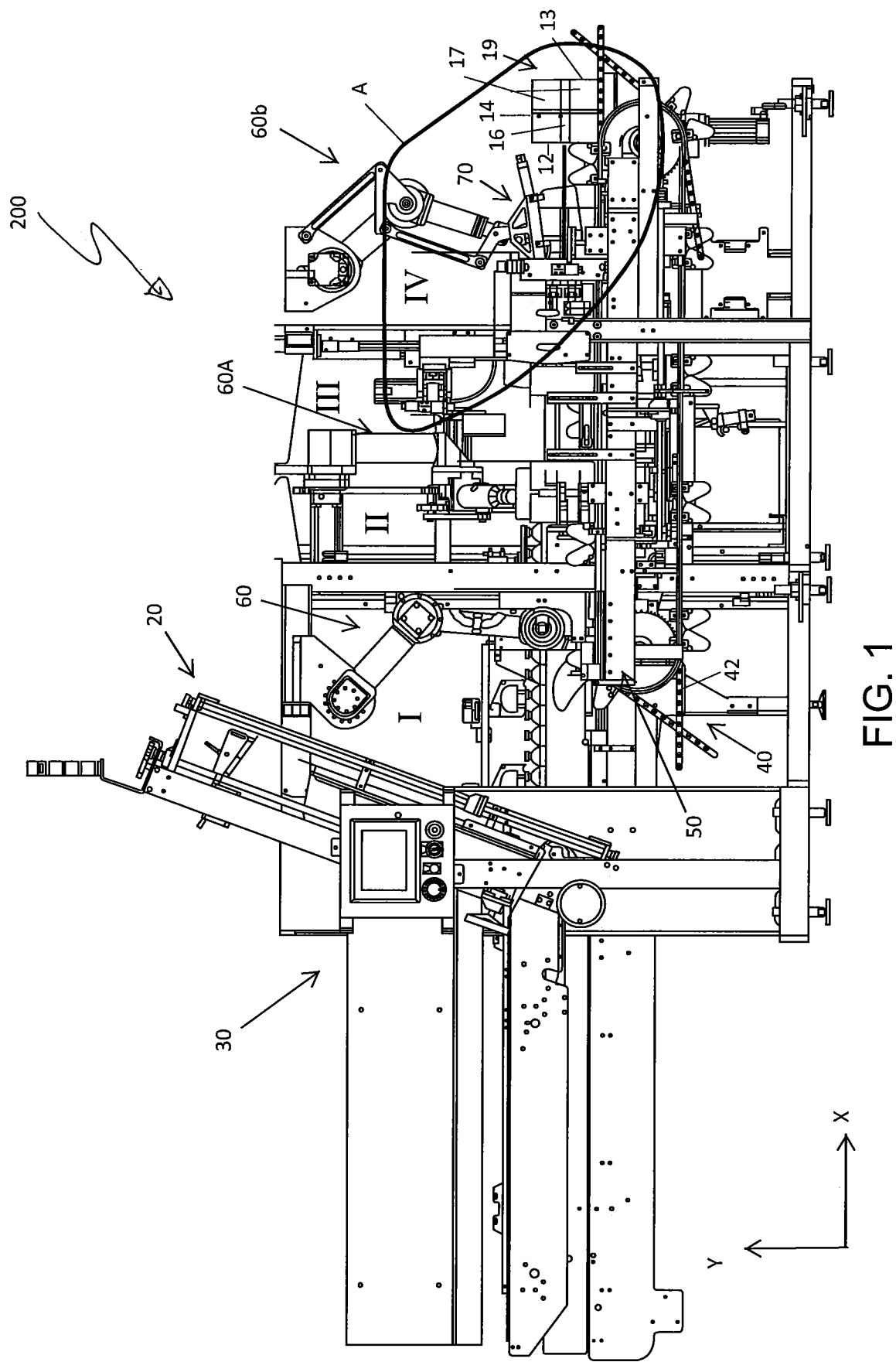
Figure 2:
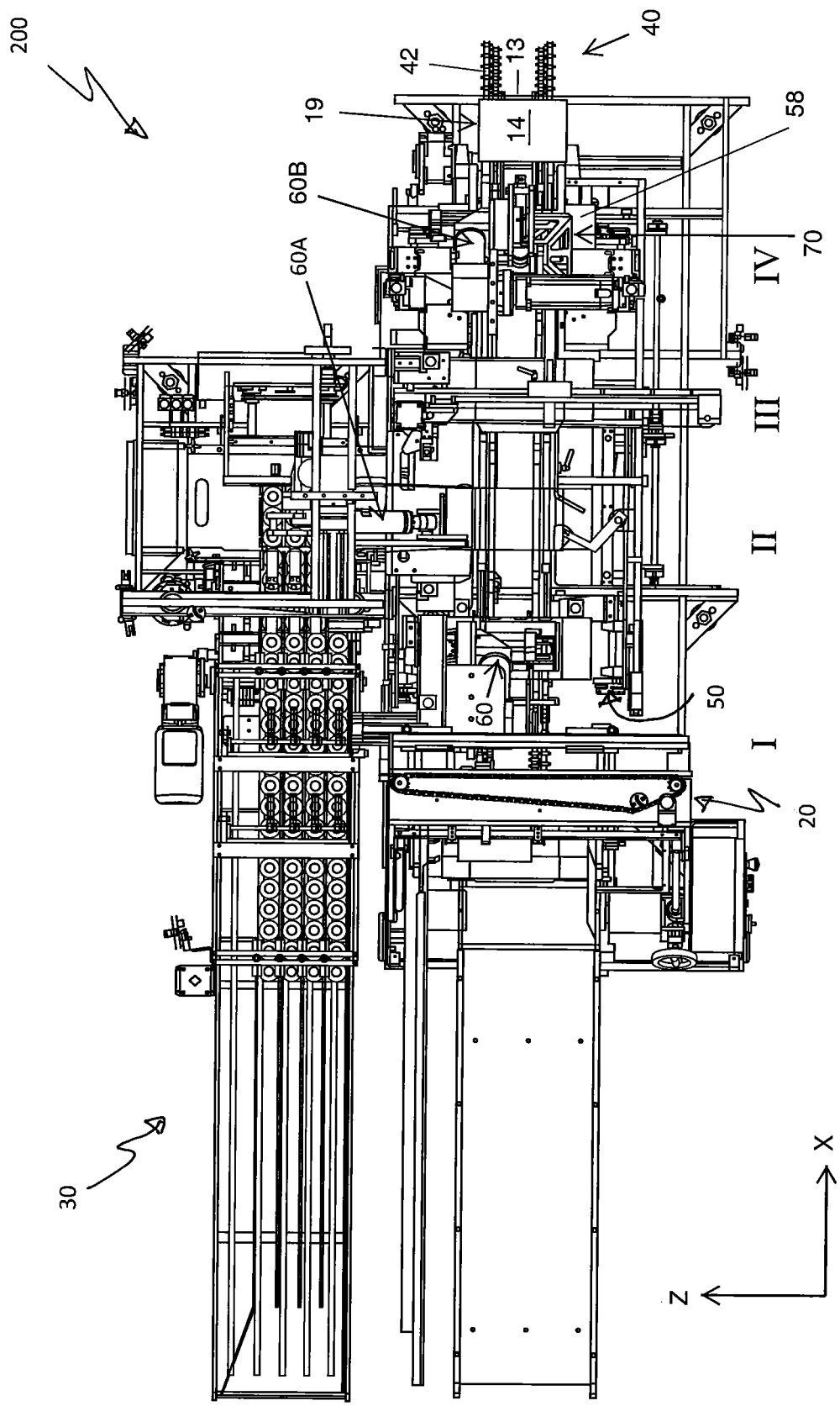
Figure 3:
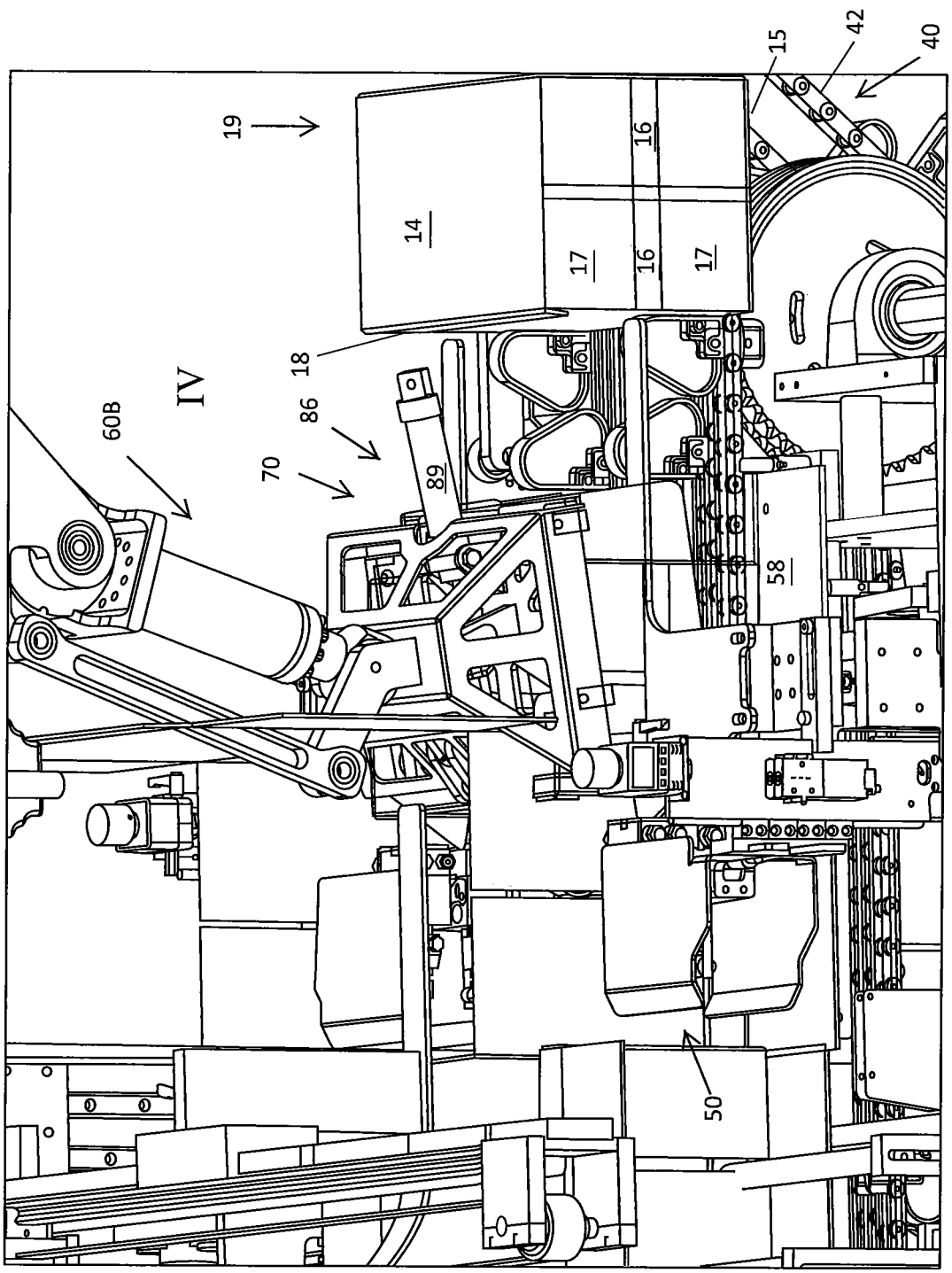

An exemplary case packer platform is depicted in elevation and plan views of FIGS. 1 & 2 respectively, with a case closure station thereof depicted in FIG. 3. An advantageous, non-limiting EOAT for effectuating loaded case closure operations, in the context of the FIG. 3 work station, is substantially depicted in the views of FIGS. 4 & 5, with an operational sequence as to a loaded case flap folding assembly thereof general indicated FIGS. 6-10.

With initial reference to FIGS. 1 & 2, there is generally shown an exemplary, non-limiting robotic case packer or case packer platform 200, process flow left to right. More particularly, a CpONE™ intermittent motion case packer from Applicant Douglas Machine Inc. of Alexandria, Minn. USA is generally depicted, with the packer further/otherwise shown and disclosed in U.S. patent application Ser. No. 16/593,288 filed on Oct. 4, 2019, as the instant application, and entitled robotic case packer platform and method, the entirety of which is incorporated herein by reference.

Characteristic elements of the illustrated case packer platform include a source of case blanks (e.g., a case blank magazine 20 as shown), a source of articles (e.g., an article infeed assembly 30 as shown), a case conveying apparatus 40, a tool bar 50, and a plurality of primary robots (e.g., a case set up robot 60, a case loading robot 60A, and a loaded case closure robot 60B). Notionally, and with additional reference to FIG. 3, the robotic case packer may be fairly categorized by functional units or stations, namely, a case set up station (Station I), a case loading station (Station II), a case flap tucking station (Station III), and a loaded case closing/compression station (Station IV), the Stations sequentially arranged in a process flow direction, Stations I, II & IV characterized by robots X Y & Z.

In connection to the illustrative representative operations and the particular operation of loaded case closure, a description of the case blank and case formed therefrom is believed instructive. Provisions for a wrap around case blank are contemplated, the blank is fairly characterized by contiguous blank panels (e.g., four panels) and flaps extending from panels of the contiguous blank panels.

Notionally, the contiguous blank panels are contiguous alternating blank panels, e.g., A/B/A/B. A first set (i.e., pair) of alternating blank panels (e.g., A; first and third panels of the four panels) form opposing case sides or side panels, in the context of the illustrated packing operation (FIGS. 1-3), vertically oriented case sides, more particularly, trailing 12 and leading 13 case side panels, with a second set (i.e., pair) of alternating blank panels (e.g., B; second and fourth panels of the four panels) forming opposing case sides or side panels, again, in the context of the illustrated packing operation, horizontally oriented case sides, more particularly, upper (i.e., top) 14 and lower (i.e., bottom) 15 case side panels.

As to the flaps of the illustrated case blank/case, each panel includes opposing flaps extending therefrom, the flaps foldable in furtherance of delimiting opposing ends of the formed case. Flaps associated with the first set of blank panels, initially folded, are vertical oriented flaps 16 for the formed case (i.e., the flaps extending from what become the opposing case sides or side panels, namely, the vertically oriented case sides). Flaps associated with the second set of blank panels, secondarily folded and thus overlying the flaps associated with the first set of blank panels, are horizontally oriented flaps 17 for the formed case (i.e., the flaps extending from what become the opposing case upper or lower panels, namely, the horizontally oriented case sides).

Finally, a free end of the case blank is characterized by a flap, more particularly, a terminal panel of the contiguous blank panels includes a flap, the flap intermediate the opposingly extending flaps thereof. In the discussion context set forth, the forth panel includes such intermediate flap, intermediate flap 18 essentially depending from the upper case side panel for folded engagement and fixed union (i.e., adhesive affixation) to/with an adjacent case side panel, namely, a surface of the trailing case side panel, a package 19 thereby delimited.

With reference now to Station IV of FIG. 3, SCARA 60B, operating in the x-y plane, is advantageously, but not necessarily, configured/adapted for two axis motion, and includes (i.e., is equipped with) an EOAT 70 for executing closure related operations in respect of a loaded case, more particularly an upper portion of the loaded case, with such operations amenable to an early start and late finish owing to the SCARAB ability to animated the EOAT for positioning throughout an enhanced range of motion in x parameter space.

A loaded case arrives for case closure from upstream operations, namely, loading at Station II and, advantageously, but not necessarily gluing at Station III, via the case conveyor 42 of case conveyor assembly 40. Via operations advantageously effectuated by tools of the tool bar, for example and without limitation, flap traps, funnels/ploughs, tuckers, and an adhesive dispensing assembly, the loaded case commences entry into Station IV for closure, the contiguous blank panels and vertically oriented flaps having been sufficiently manipulated so as to present a loaded case for closure operations, namely, and advantageously, squaring, remaining flap closure, sealing and compression. As will be subsequently presented, remaining flap closure, sealing and compression is effectuated by robotic EOAT 70 in respect to an upper portion of the loaded case, and by a lower loaded case compression assembly/apparatus 58 advantageously, but not necessarily part-and-parcel of tool bar 50 of robotic case packer 200.

Figure 4:
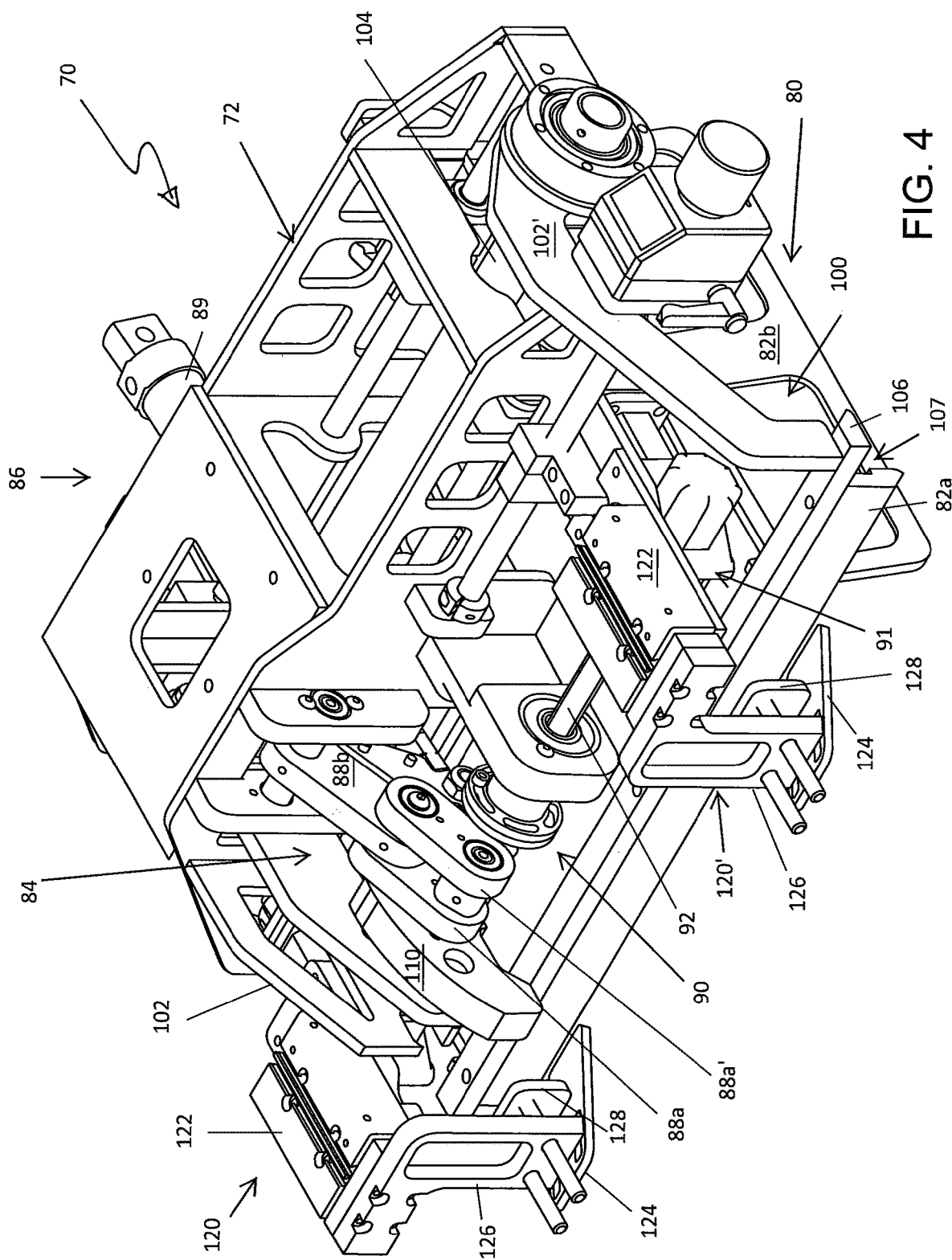
Figure 5:
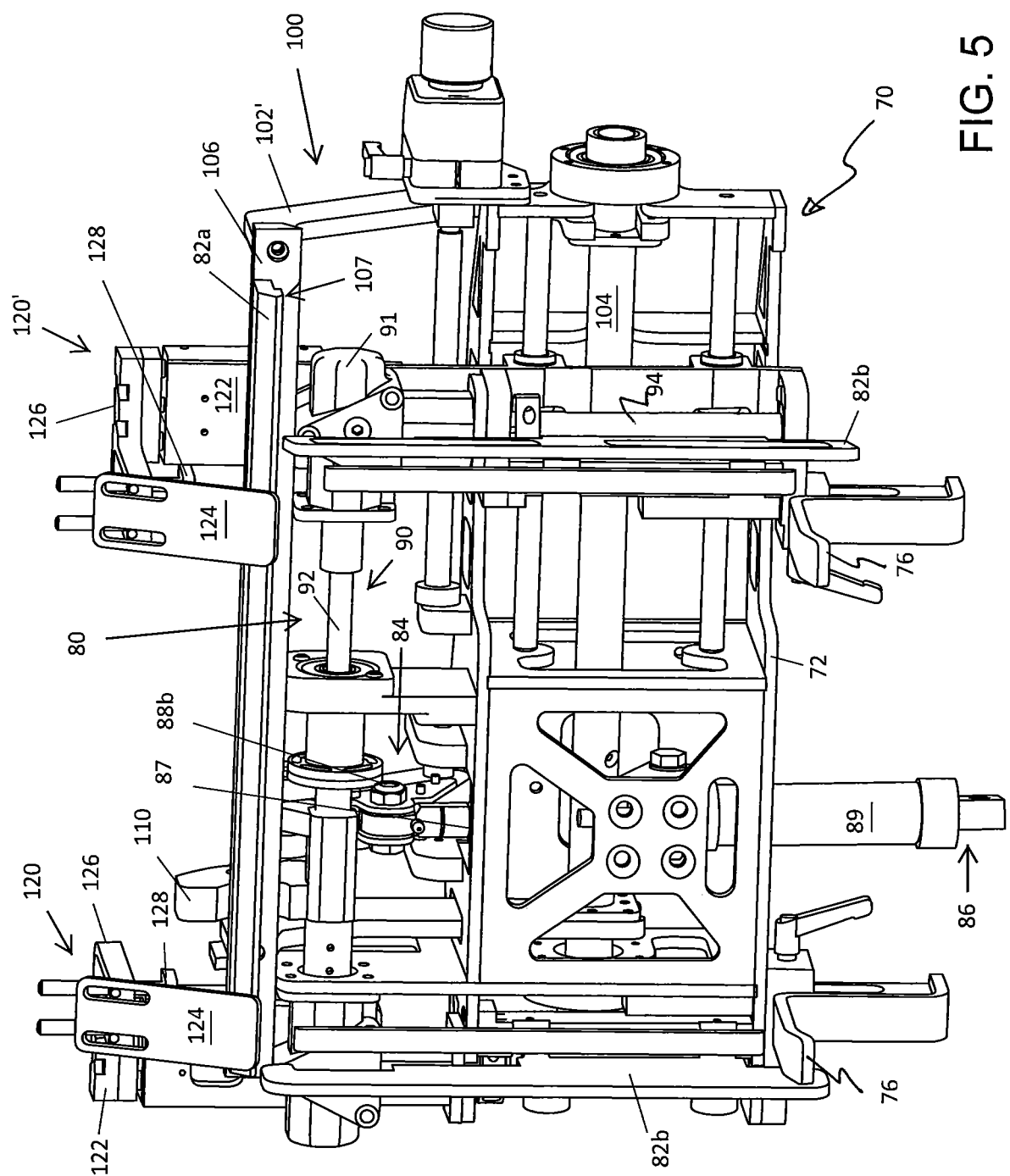
Figure 6:
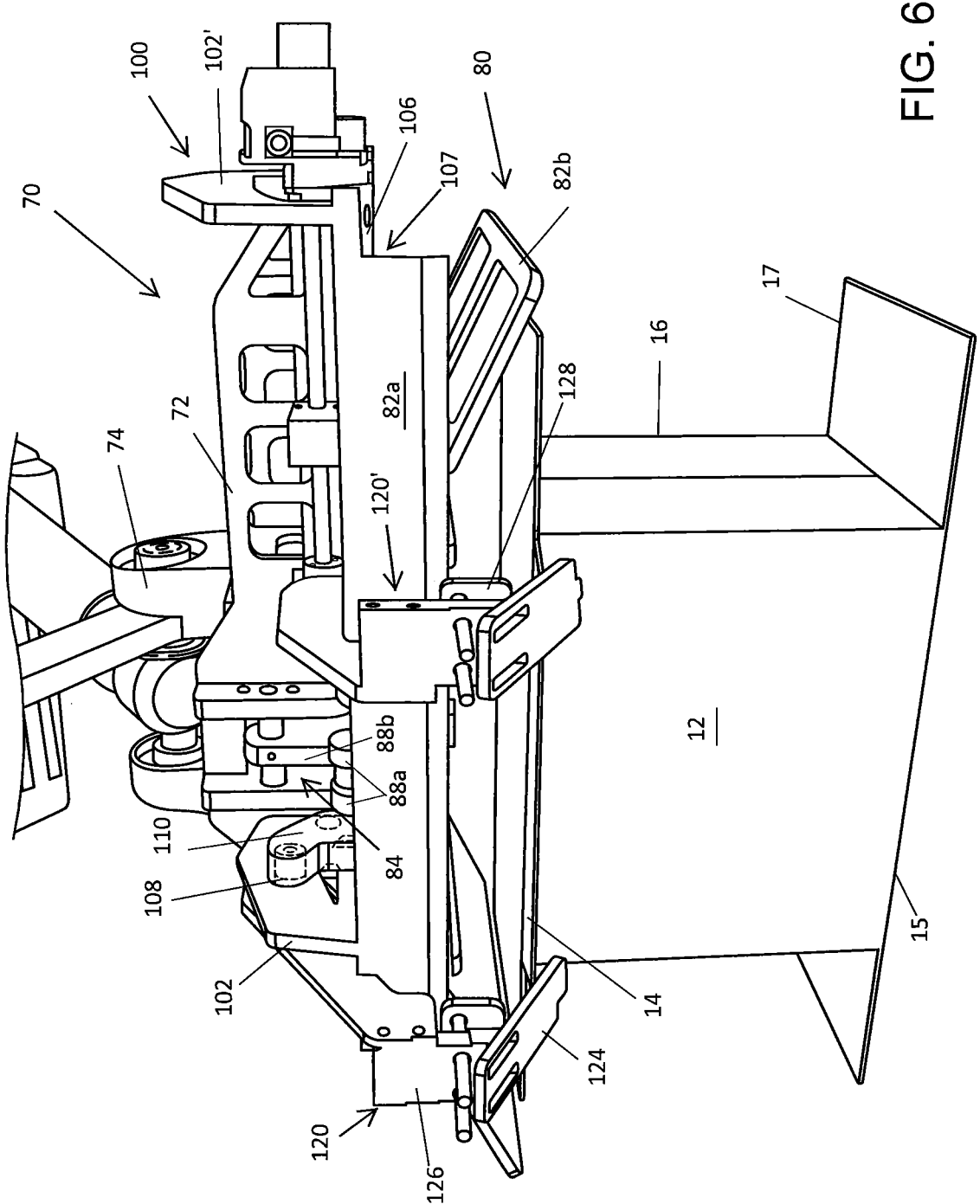
Figure 7:
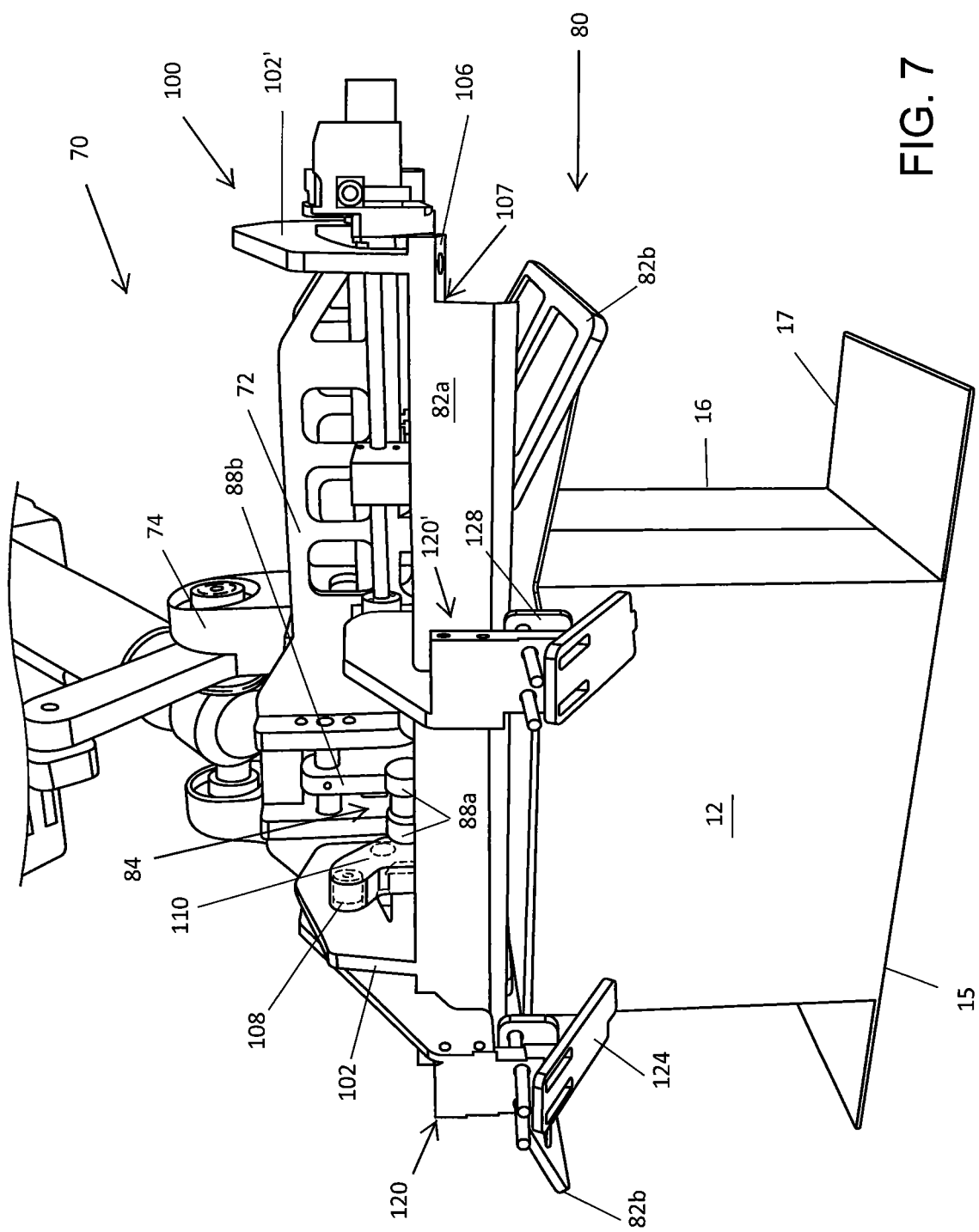
Figure 8:
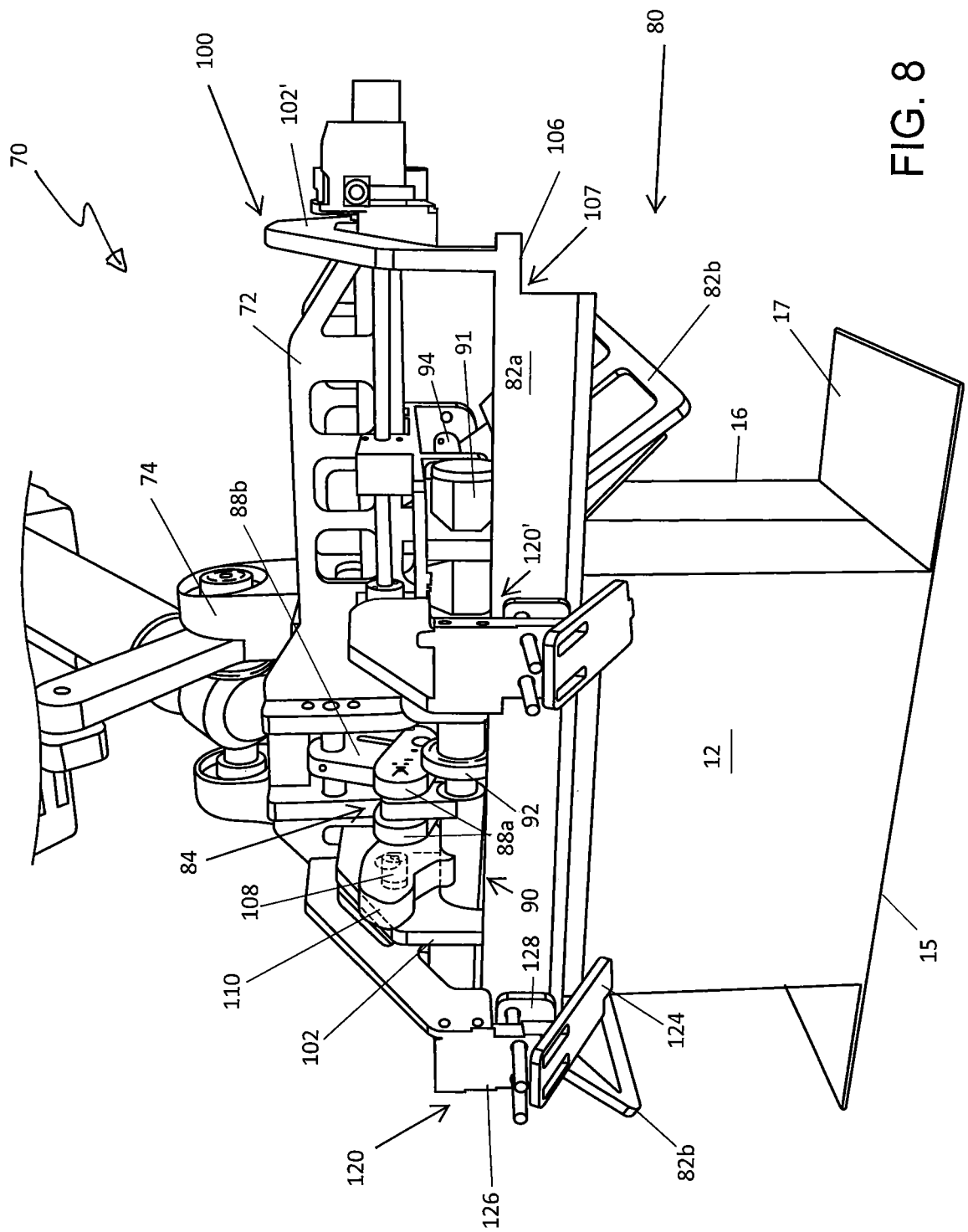
Figure 9:
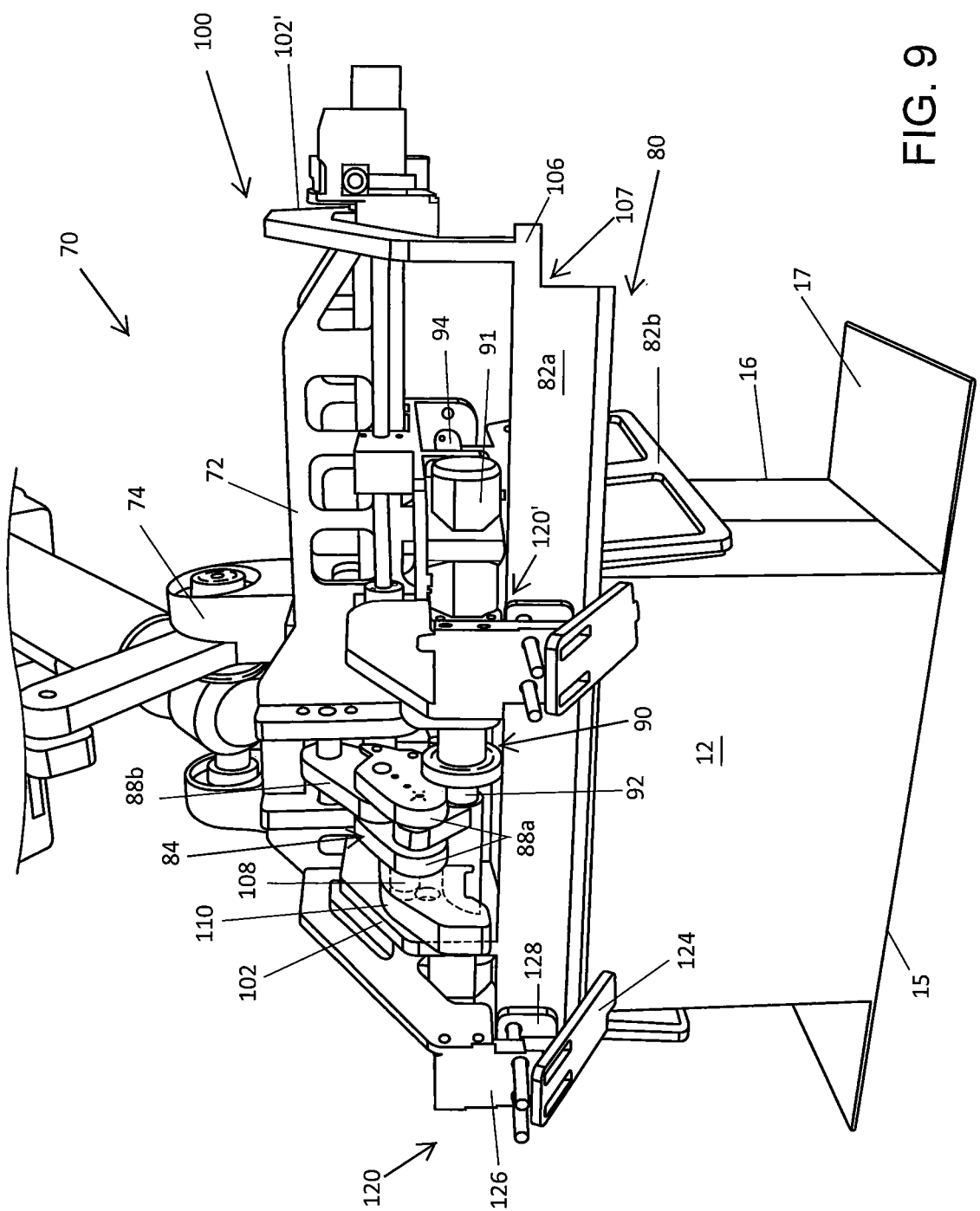
Figure 10:
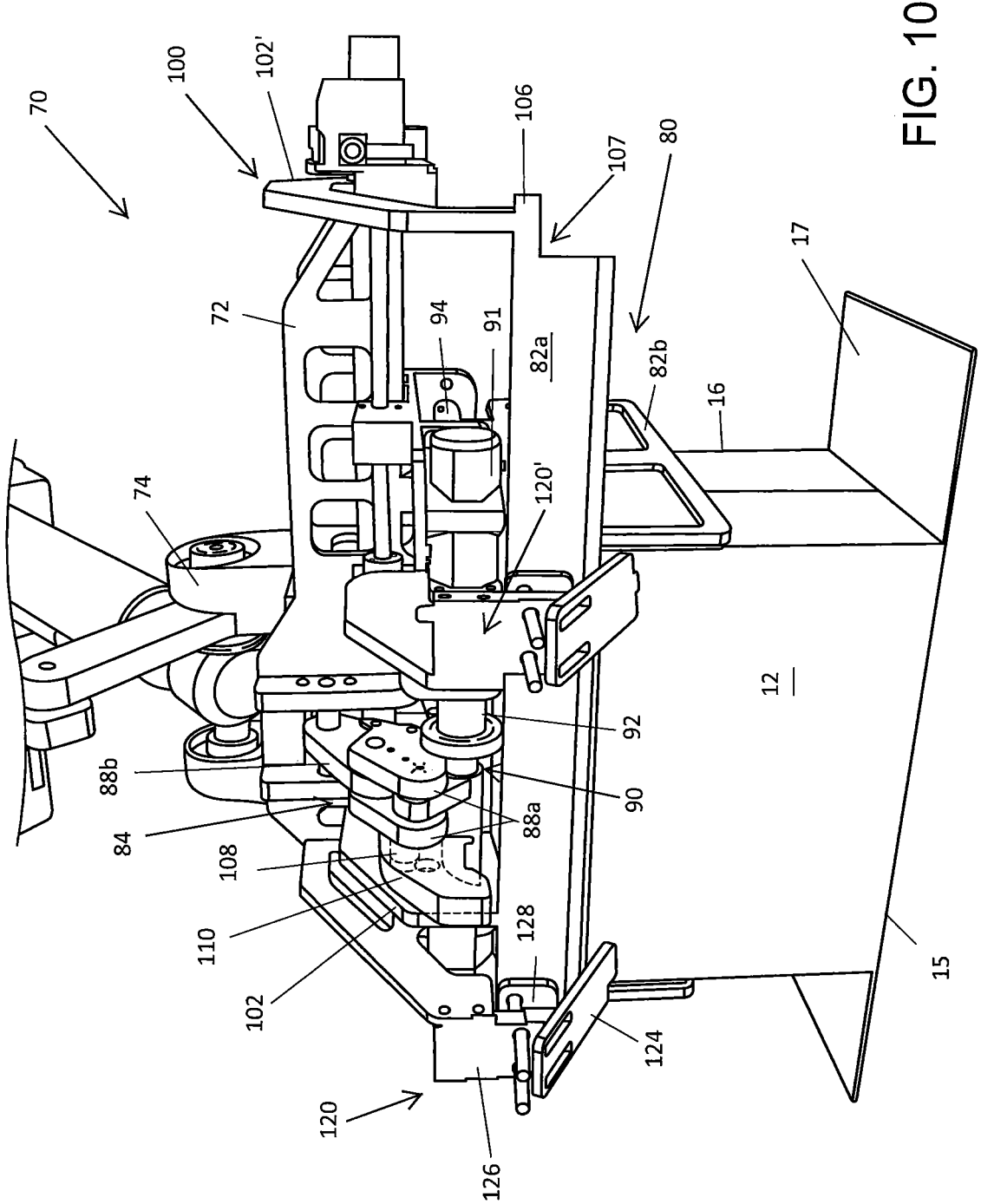

Referring now to FIGS. 4 & 5, there is shown, in two views, advantageous, non-limiting robotic EOAT 70 to effectuate loaded case closure operations in furtherance of the establishment of package 18 (FIG. 3). EOAT 70 is notionally and generally characterized by a loaded case flap folding assembly 80, a loaded case squaring assembly, advantageously, but not necessarily, as shown, spaced apart loaded case squaring assemblies 120, 120', and a frame or framework 72 for supporting the noted assemblies, frame 72 including or adapted to include a robotic arm mating structure or interface 73 (FIGS. 6-10). While it is contemplated that the EOAT be pivotingly carried by the SCARA, it may be desirably rotatingly carried by the SCARA.

The loaded case flap folding assembly 80 primarily effectuates folding of flaps extending from a first case panel of a loaded case, the first case panel advantageously, but not necessarily comprising upper (top) case side panel 14 (see e.g., FIG. 3). A degree of case squaring is likewise effectuated via application of a compressive force via the robotic EOAT/robot along an upper trailing edge of the closed loaded case. Notionally, loaded case flap folding assembly 80 is characterized by flap engaging elements 82, a linkage 84 and an actuator 86, flap engaging elements 82 operatively united with linkage 84, as will be subsequently taken up, linkage 84 actuatable via actuator 86.

Flap engaging elements of the loaded case flap folding assembly include a first flap engaging element, advantageously but not necessarily in the form of a bar 82a as shown, for engagement with a first flap extending from the first case panel of the loaded case. Second and third flap engaging elements are further provided, in the form of plates 82b as illustrated, for engagement with second and third flaps opposingly extending from the first case panel, each of the second and third flaps adjacent the first flap.

Linkage 84 of loaded case flap folding assembly 80 advantageously but not necessarily comprises a mechanical toggle lock. Linkage 84 is fairly characterized by cooperating links 88 and shafting 90 united thereto. As illustrated, the links comprise a link pair 88a, 88a', operatively secured to a portion of a shaft of shafting 90 of linkage 84, e.g., via a tab or the like, a further link 88b uniting link pair 88a, 88a' with the actuator, e.g., a servo driven motor or pneumatic device, more particularly as shown, to a rod 87 of a pneumatic rod and cylinder actuator 86.

Shafting 90 of linkage 84 of loaded case flap folding assembly 80 is preferably but not necessarily characterized by a primary shaft 92 and secondary shafts 94 slaved thereto via right angle gear boxes 91 or the like. While flap folding plates 82b for the second and third flaps are directly supported upon secondary shafts 94 for pivot motion in furtherance of flap closure, flap folding bar 82a is indirectly linked to primary shaft 92 as is subsequently taken up.

The first flap engaging element of the loaded case flap folding assembly is advantageously provided as part of a pivotable first flap folding subassembly 100. A pair of spaced apart arms 102, 102' extend from a journaled shaft 104, free end portions of arms 102, 102' united via a bar, a flat bar 106 as shown, folding bar 82a, likewise advantageously in the form of a flat bar, depending therefrom so as to thereby form a crotch 107, a top trailing loaded case edge receivable therein part-and-parcel of loaded case squaring/squaring compression operations. One arm 102 of the pair of spaced apart arms 102, 102' is adapted to carry a track follower 108 (see FIGS. 6-10) for cooperative engagement (i.e., slaved travel) within a track 109 of a track block 110, i.e., an arcuate groove of a surface of the block, carried by primary shaft 92 during rotation of same.

With continued reference to FIGS. 4 & 5, case squaring, initial case squaring as will be appreciated in connection to a later overview of the operative illustrations of FIGS. 6-10, is effectuated via operation of the loaded case squaring assembly, advantageously, but not necessarily in the form of paired loaded case squaring assemblies 120, 120' as illustrated. Case squaring assemblies 102, 102' are generally supported by EOAT frame or framing 72 in a spaced apart condition so as to impart an effective force upon trailing loaded case panel 12.

Loaded case squaring assemblies 120, 120' generally include an actuator, for example, a linear actuator 122 as shown, and a case panel engaging element, namely, a trailing panel square 124 as shown, trailing panel square 124 actuatable by actuator 122. A support member 126 unites trailing panel square 124 with actuator 122, the trailing panel square angularly and adjustably extending therefrom in a downward direction (i.e., y parameter space), a free end portion of square 124 engaging trailing loaded case panel just below an engagement point for the first flap folding element of the loaded case flap folding assembly, more particularly, flap folding bar 82a of pivotable first flap folding subassembly 100.

Leading panel squares 76 (FIG. 5) are operably and adjustably supported by EOAT frame or framing 72, leading panel squares 76 performing a loaded case retaining function for robotic EOAT 70. More particularly, with leading case panel 13 secured during initial squaring operation by leading panel squares 76, spaced so as to oppose actuatable trailing panel squares 124, engagement of trailing case panel 12 via actuated trailing panel squares 76 sufficiently urges the loaded case against leading panel squares (i.e., the loaded case is tensioningly retained between leading/trailing panel square pairs) so as to effectuate an initial and substantial case squaring in advance of loaded case flap folding, sealing and compression operations via the robotic EOAT.

Squaring assembly 120, 120' is further, and preferably, but not necessarily, characterized by an alignment element. More particularly, an adjustable alignment element 128 (x parameter space) is carried by support member 126 above trailing panel square 124 to insure proper first flap orientation in advance of folding via flap folding bar 82a of pivotable first flap folding subassembly 100 of loaded case flap folding assembly 80.

As to robotic EOAT function, the loaded case squaring assemblies thereof are first to be called into action upon suitable animation of the EOAT, by the robot, towards the loaded case from above, and with proximity placement as to same. In a readied or stand by state, linear actuators 122 position trailing panel squares 124 in extension, with trailing panels squares 124 thereafter retracted, in a direction of process flow, to sufficiently engage a loaded case positioned in Station IV, substantial loaded case squaring thereby effectuated as an initial or preliminary step as to loaded case closure.

With reference now to the robotic EOAT operation sequence of FIG. 6-10, upon completion of travel of trailing panel squares 124 of loaded case squaring assemblies 120, 120', pneumatic actuator of loaded case flap folding assembly 80 is activated in furtherance of acting upon linkage 84 thereof. As rod 87 extends from cylinder 89, it drives link 88b in a counter process flow direction with the operative combination of links 88 pivoting upward to rotate primary shaft 92 of shafting 90 counter clockwise (FIG. 4) so as to effectuate a pivoted lowering of first flap folding subassembly 100 and thereafter engagement of bar 82a, 106 combination, via crotch 107, with an upper trailing edge of the squared loaded case. Moreover, rotation of primary shaft 92 results in secondary shaft 94 counter clockwise rotation (end view in a process flow direction) so as to effectuate a pivoted lowering of second and third panel plates 82b in furtherance of folding the second and third panels to form closed loaded case ends. At full extension of links 88 of linkage 84, operation of the mechanical toggle lock delimited thereby imparts a compressive force upon the closed loaded case so as to form sought after package 19. Thereafter, actuator 86 of loaded case flap folding assembly 80 is deactivated, the functional closure mechanisms of loaded case flap closure assembly 80 returning to their readied posture or configuration, and actuator 122 of loaded case squaring assemblies 120, 120' likewise deactivated, the functional closure mechanisms of loaded case squaring assemblies 120, 120' returning to their readied posture or configuration.

What has been described and depicted herein are preferred, non-limiting embodiments of Applicant's subject matter, along with one or more application contexts. Since the structures of the assemblies, subassemblies, and/or mechanisms disclosed herein may be embodied in other specific forms without departing from the spirit or general characteristics thereof, some of which forms have been indicated, the embodiments described and depicted herein/with are to be considered in all respects illustrative and not restrictive. Moreover, while nominal processing has be described and detailed, and to some degree alternate work pieces and systems, assemblies, etc. with regard thereto referenced, contemplated system and/or processes are not so limited. Accordingly, the scope of the subject invention is as defined in the language of the appended claims, and includes not insubstantial equivalents thereto.

That which is claimed:

1. A robotic end of arm tool to effectuate loaded case closure comprising:
    a. a loaded case flap folding assembly to effectuate folding of flaps extending from a first case panel of a loaded case, said loaded case flap folding assembly comprising flap engaging elements, a linkage and an actuator, said flap engaging elements operatively united with said linkage, said linkage actuatable via said actuator in furtherance of causing said flap engaging elements to engage the flaps extending from the first case panel, said flap engaging elements comprising a first flap engaging element for engagement with a first flap extending from the first case panel of the loaded case, and second and third flap engaging elements for engagement with second and third flaps opposingly extending from the first case panel, each of the second and third flaps adjacent the first flap;
    b. loaded case squaring assemblies, a first loaded case squaring assembly spaced apart from a second loaded case squaring assembly, said loaded case squaring assemblies comprising an actuator and a case panel engaging element, said case panel engaging element actuatable by said actuator in furtherance of engaging a second case panel, the second case panel adjacent the first case panel; and,
    c. a tool frame for supporting said loaded case flap folding assembly and said loaded case squaring assemblies, said tool frame including a mechanical mating structure for mechanically uniting the end of arm tool to a robotic arm.

2. The robotic end of arm tool of claim 1 wherein said linkage includes cooperating links and shafting united thereto, said flap engaging elements depending from said shafting.

3. The robotic end of arm tool of claim 1 wherein said linkage includes cooperating links and shafting united thereto, said shafting including a primary shaft and secondary shafts, said primary shaft united with said cooperating links, said secondary shafts slavingly united with said primary shaft.

4. The robotic end of arm tool of claim 1 wherein said linkage includes cooperating links and shafting united thereto, said shafting including a primary shaft and secondary shafts, said primary shaft united with said cooperating links, said secondary shafts slavingly united with said primary shaft, said first flap engaging element depending from said primary shaft, said second and third flap engaging elements depending from said secondary shafts.

5. The robotic end of arm tool of claim 1 wherein said linkage includes cooperating links and shafting united thereto, said first flap engaging element carried by an arm, said arm operatively united with said shafting for pivot motion in respect thereof.

6. The robotic end of arm tool of claim 1 wherein said linkage includes a cooperating links and shafting united thereto, said first flap engaging element carried by an arm, said arm operatively united with said shafting, via a track block, for pivot motion in respect thereof.

7. The robotic end of arm tool of claim 1 wherein said actuator of said loaded case flap folding assembly comprises a pneumatic actuator.

8. The robotic end of arm tool of claim 1 wherein said actuator of said loaded case flap folding assembly comprises a pneumatic actuator characterized by, in operative combination, a rod and cylinder.

9. The robotic end of arm tool of claim 1 wherein said actuator of said loaded case flap folding assembly comprises a servo driven motor.

10. The robotic end of arm tool of claim 1 wherein said actuator of said loaded case squaring assemblies comprises a pneumatic actuator.

11. The robotic end of arm tool of claim 1 wherein said actuator of said loaded case squaring assemblies comprises a linear actuator.

12. The robotic end of arm tool of claim 1 wherein said first flap engaging element comprises a bar.

13. The robotic end of arm tool of claim 1 wherein each of said second and third flap engaging element comprise plates.

14. The robotic end of arm tool of claim 1 wherein said first flap engaging element comprises a bar, and each of said second and third flap engaging element comprise plates.

15. The robotic end of arm tool of claim 1 wherein said second and third flap engaging elements for engagement with second and third flaps opposingly extending from the first case panel further engage flaps opposingly extending from a third case panel, the third case panel opposite the first case panel.

16. The robotic end of arm tool of claim 1 wherein said loaded case flap folding assembly further comprises a pivotable first flap folding subassembly, said first flap engaging element operatively carried thereby.

17. The robotic end of arm tool of claim 1 wherein said loaded case flap folding assembly further comprises a pivotable first flap folding subassembly, said pivotable first flap folding subassembly including an arm for operable support of said first flap engaging element.

18. The robotic end of arm tool of claim 1 wherein said loaded case flap folding assembly further comprises a pivotable first flap folding subassembly, said pivotable first flap folding subassembly including an arm for operable support of said first flap engaging element, said arm adapted for operative engagement by a portion of said linkage so as to pivot said subassembly.

19. The robotic end of arm tool of claim 1 further comprising an adhesive dispensing assembly for applying adhesive to the first flap of the first case panel in furtherance of adhesively uniting the first flap of the first case panel to an adjacent case panel.

20. A robotic end of arm tool to effectuate loaded case closure comprising a first loaded case flap folding mechanism for operation upon a first flap of flaps extending from a first case panel of a loaded case, a second loaded case flap folding mechanism for operation upon second and third flaps of flaps extending from the first case panel of the loaded case, a linkage operably joined to each of said first loaded case flap folding mechanism and said second loaded case flap folding mechanism, an actuator actuatable to effectuate a change in a configuration for said linkage which simultaneously activates said first loaded case closure mechanism and said second loaded case closure mechanism, and a tool frame for supporting the first and second loaded case flap folding mechanisms, said tool frame including a mechanical mating structure for mechanically uniting the end of arm tool to a robotic arm.

21. The robotic end of arm tool of claim 20 further comprising an actuatable loaded case squaring mechanism, said actuatable loaded case squaring mechanism being activated so as to square the loaded case in advance of activation of said first loaded case closure mechanism and said second loaded case closure mechanism.

* * * * *